US007516460B2

United States Patent
Ramani (10) Patent No.: US 7,516,460 B2
(45) Date of Patent: Apr. 7, 2009

(54) SYSTEM AND METHOD FOR CREATING A RUNTIME CONNECTION INTERFACE FOR ATTRIBUTES AND ELEMENT TAGS DEFINED WITHIN A SUBCLASS IN A MARKUP DOCUMENT

(75) Inventor: Sundaram Ramani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 594 days.

(21) Appl. No.: 10/377,196

(22) Filed: Feb. 28, 2003

(65) Prior Publication Data
US 2004/0172627 A1    Sep. 2, 2004

(51) Int. Cl.
*G06F 9/00* (2006.01)
(52) U.S. Cl. .................... 719/331; 717/140; 717/143; 715/234; 719/318; 719/332
(58) Field of Classification Search .......... 719/328, 719/331, 332, 318; 715/513, 234; 717/140, 717/143
See application file for complete search history.

(56) References Cited

U.S. PATENT DOCUMENTS

| | | | | |
|---|---|---|---|---|
| 6,063,128 | A   * | 5/2000  | Bentley et al. | ......... 703/6 |
| 6,342,907 | B1   | 1/2002  | Petty et al. | ......... 345/762 |
| 6,442,576 | B1 * | 8/2002  | Edelman et al. | ......... 715/513 |
| 6,446,096 | B1 * | 9/2002  | Holland et al. | ......... 715/513 |
| 6,772,206 | B1 * | 8/2004  | Lowry et al. | ......... 709/223 |
| 6,880,125 | B2 * | 4/2005  | Fry | ......... 715/513 |
| 6,964,013 | B1 * | 11/2005 | Ono et al. | ......... 715/513 |
| 2002/0091818 | A1 | 7/2002 | Cascio et al. | ......... 709/224 |

OTHER PUBLICATIONS

Keisuke Nakano and Susumu Nishimura; "Deriving Event-Based Document Transformers from Tree-Based Specifications"; Electronic Notes in Theoretical Computer Science 44 No. 2 (2001); pp. 1-25.
Jue, Xia et al., "Design and Implementation of a SMIL Player", Proceedings of the SPIE—The International Society for Optical Engineering, vol. 3648, 1998, pp. 382-389.

\* cited by examiner

*Primary Examiner*—Meng-Ai An
*Assistant Examiner*—Phuong N Hoang
(74) *Attorney, Agent, or Firm*—Merchant & Gould, P.C.

(57) ABSTRACT

Described is a system and method for creating a runtime connection interface for attributes and element tags defined declaratively in a subclass within a markup document. These subclass attributes may define an event, and the element tags scoped inside a subclass may define a resource, and the like, associated with the subclass being defined within the markup document. During runtime, the runtime connection interface allows a parser to make direct calls to connect the subclass attribute with an associated instance of the subclass. The system and method include identifying an attribute or element tag defined within a markup document. The attribute or element tag is associated with a target element being declaratively defined within the markup document. The attribute may define an event, and an element tag resource, and the like, associated with a target element that is also declared within the subclass in the markup. An identifier for the target element is determined. An executable assembly is generated that provides a runtime connection mechanism that is configured to attach an item associated with the attribute or element tag to an instance of the target element during runtime. Thus, in accordance with the present invention, an event handler that is declaratively defined within markup is compiled in a manner such that during runtime a direct call hooks up the event handler with the instance of the target element.

36 Claims, 7 Drawing Sheets

```
401 ──<FlowPanel ID="root" Background="White"

xmlns="using:System.Base"

xmlns:def="Definition"

def:Language="C#">       410      412      414
402 ──   <Button Click="OnClick" ID="button1">Button1</Button>
                                 420      424
404 ──   <Button Click="OnClick">Button2</Button>

408 ──   <def:Code> <![CDATA[ void OnClick(Element sender, ClickEventArgs args)
406 ──     {
               button1.Nodes.Add("hello");
           }

]]></def:Code>

</FlowPanel>
```

```
1   public class Page : System.Base.FlowPanel,System.Base.Parser.IElementInit {
2
3   private System.Base.FlowPanel root;
4
5   private System.Base.Button button1;
6
7   void OnClick(Element sender, ClickEventArgs args)
8   {    button1.Nodes.Add("hello");              }
9
10  public Page() {
11  }
12
13  void System.Base.Parser.IElementInit.OnsetID(string id, System.Base.Element targer)
14  {
15    switch(id)
16    {
17    case "root":
18      this.root = ((System.Base.FlowPanel)(target));
19      break;
20
21    case "button1":
22      this.button1 = ((System.Base.Button)(target));
23      target.AddHandler(System.Base.ButtonBase.ClickEvent,
24                       new System.Base.ClickEventHandler(this.OnClick),
25                       EventStage.Bubble,
26                       EventHandled.Unhandled,
27                       true);
28      break;
29
30    case "__Element3__":
31      target.AddHandler(System.Base.ButtonBase.ClickEvent,
32                       new System.Base.ClickEventHandler(this.OnClick),
33                       EventStage.Bubble,
34                       EventHandled.Unhandled,
35                       true);
36      break;
37    }
38  }
39  }
40
```

*Fig. 7*

SYSTEM AND METHOD FOR CREATING A RUNTIME CONNECTION INTERFACE FOR ATTRIBUTES AND ELEMENT TAGS DEFINED WITHIN A SUBCLASS IN A MARKUP DOCUMENT

BACKGROUND OF THE INVENTION

Today, software development tools allow software developers the ability to build executable components using one or more programming languages, such as C, C++, C#, and the like. One advantage for building executable components is that the components, once built, may be re-used by other software programs. Another advantage for building executable components is that new components may be easily extended from existing components.

Generally, components are extended by subclassing, which means deriving a new class from an existing class. These classes and subclasses are written using one of the programming languages. The code that is written is commonly referred to as source code. For traditional runtime environments, the software development tools compile the source code into object code and then link multiple object codes together to create an executable. However, one of the problems with these traditional runtime environments is that each programming language and each version of the programming language require a different runtime environment.

To overcome this problem, a new type of runtime environment has been designed that effectively eliminates many of the cross-language interface and language version problems of the traditional runtime environments. In this new type of runtime environment, development tools compile the source code into an intermediate language. During runtime, the runtime environment compiles the intermediate language into native binary executable code. Thus, the new runtime environment performs the "linking-type" process during runtime. In order to perform this "linking-type" process, the runtime environment reads information (e.g., metadata) and accesses assemblies for the components associated with the program that is being run. In addition, the "linking-type" process uses reflection to identify methods, properties, and the like associated with the component. The metadata includes descriptions for types, versions, resources, and the like. The assemblies may be a single dynamic link library (DLL), or numerous DLLs and resources. These "linking type" processes are quite slow.

Given the advantages of using components, there is a need for a better mechanism for performing this "linking type" process.

SUMMARY OF THE INVENTION

The present invention is directed at a system and method for creating a runtime connection interface for attributes and element tags defined within a subclass in a markup document. The subclass attributes may define an event, and element tags defined in the scope of a subclass may define a resource, and the like, associated with the subclass being defined within the markup document. During runtime, the runtime connection interface allows a parser to make direct calls, rather than to use reflection, to connect the attributes and element tags defined within a subclass with an associated instance of the subclass. For example, the present invention allows an event handler (i.e., a subclass attribute) to become connected with an instance of a target element (i.e., the target element being a specific subclass type) by directly calling a hookup method (i.e., the runtime connection interface) created in accordance with the present invention.

The mechanism of the present invention compiles subclass attributes into associated methods that are configured to connect the subclass attributes directly. One advantage of the present invention is that direct calls may be made to attach event handlers during runtime. Another advantage of the present invention is that resources defined within a markup document (and identified via a resource ID) may be resolved during compilation of the markup document into an intermediate language file.

DETAILED DESCRIPTION OF THE PREFERRED EMBODIMENT

The present invention is directed at a system and method for creating a runtime connection interface for subclass attributes and elements defined within a markup document. The subclass attributes may define an event, and the subclass elements a resource, and the like, associated with a subclass being defined within the markup document. In the following description, the subclass attribute is associated with an event. Therefore, through-out the description, the runtime connection interface refers to the mechanism as an event "hook-up" mechanism. The event hook-up mechanism directly associates an event handler with a specific instance of an element during runtime, rather than using reflection during runtime to hook-up the event handler with the specific instance of the element. One skilled in the art, after a careful reading of the following description, may use the teachings of this runtime connection mechanism for "hooking-up" other items to specific instances of elements during runtime, such as hooking-up resources and the like. Thus, as will be described in detail below, the runtime connection mechanism of the present invention allows a parser, during runtime, to make direct calls to "hook-up" an event handler to a specific instance. This runtime connection mechanism provides a faster technique for hooking up events in comparison with a prior method that relied on reflection during runtime to hook up events.

The following detailed description is divided into several sections. A first section describes an illustrative computing device in which the present invention may operate. A second section describes an exemplary computing environment for the present invention. A third section describes an exemplary embodiment for creating a runtime connection for subclass attributes (i.e., events) in accordance with the present invention.

Illustrative Computing Device

Figure 1:
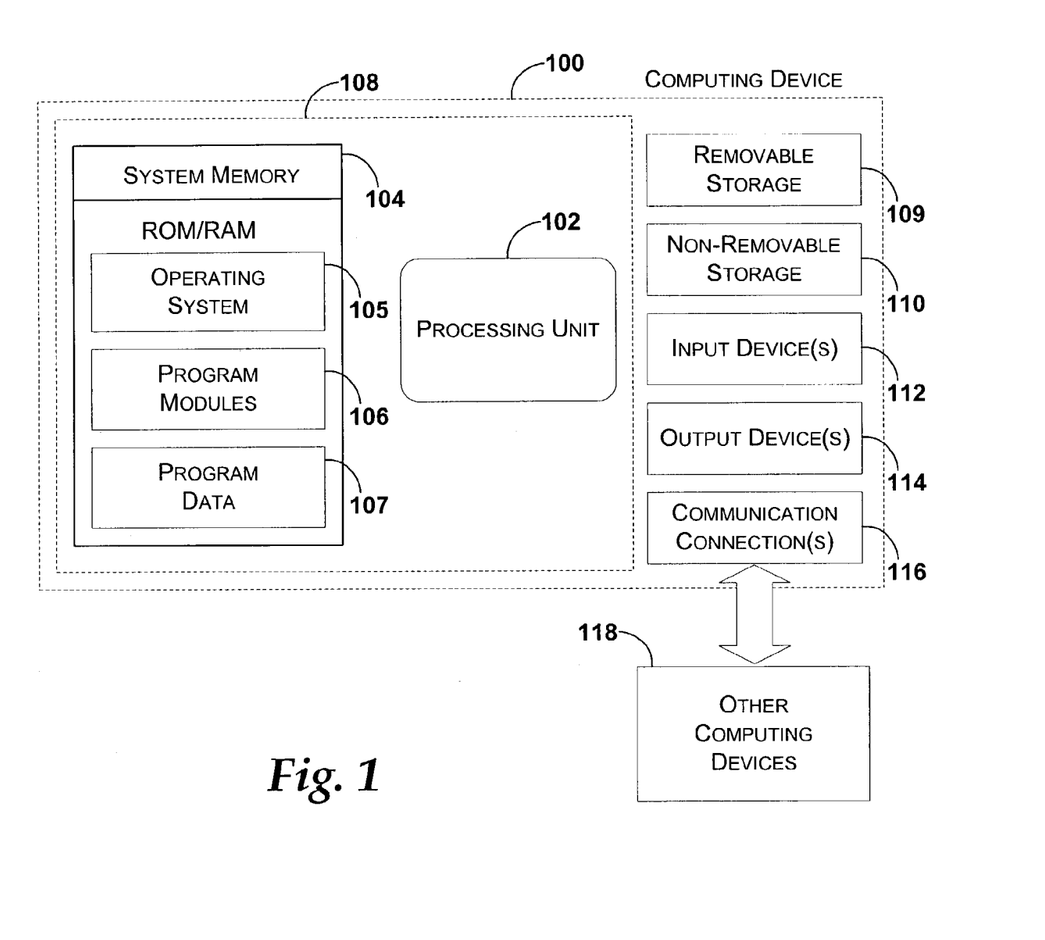
FIG. 1 illustrates an exemplary computing device that may be used in illustrative implementations of the present invention.

FIG. 1 illustrates an exemplary computing device that may be used in illustrative implementations of the present invention. With reference to FIG. 1, in a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. Examples of program modules 106 include a browser application, a finance management application, a word processor, and the like. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Implementation

Figure 2:
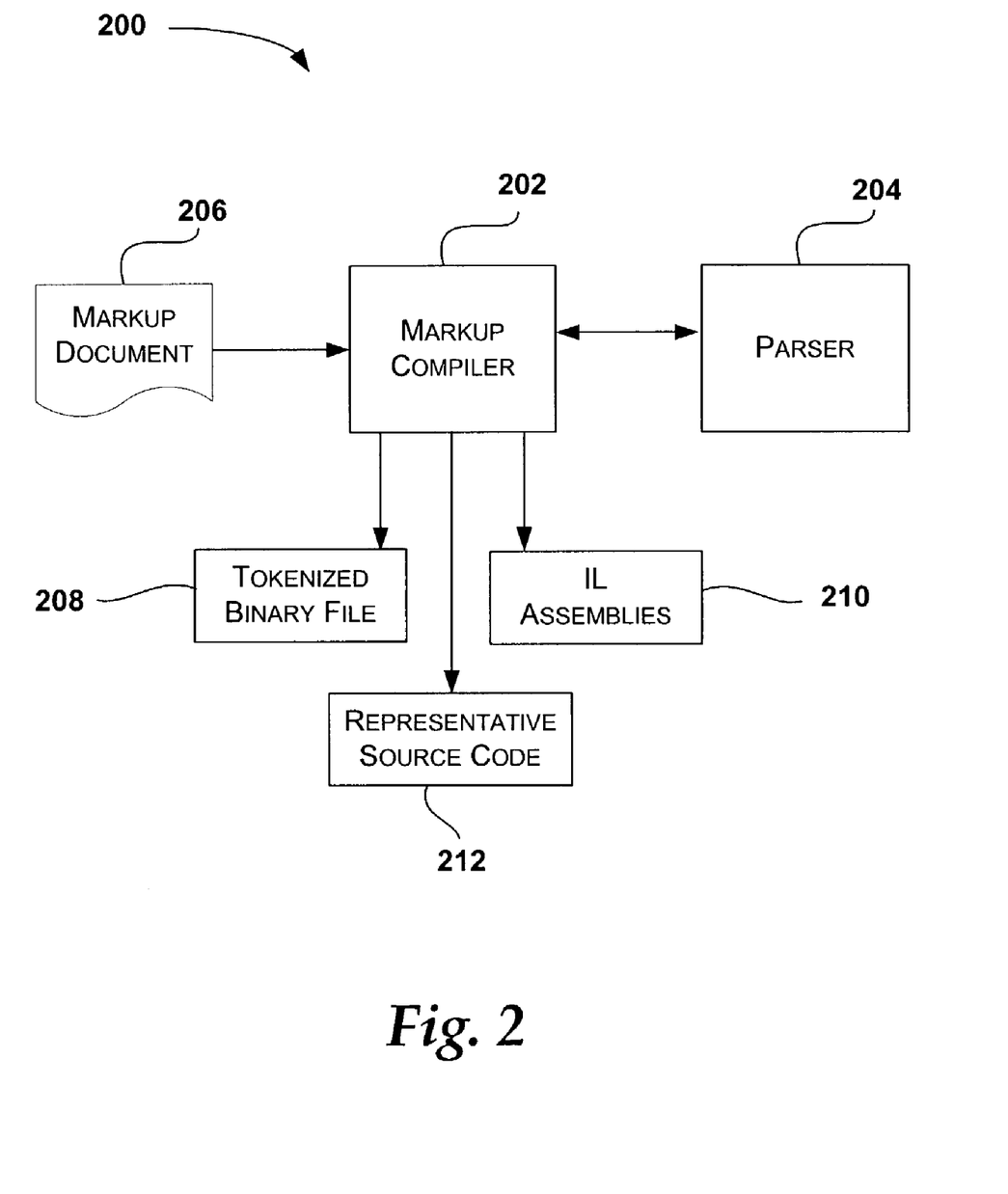
FIG. 2 is a functional block diagram generally illustrating components for implementing one embodiment of the present invention.

FIG. 2 is a functional block diagram generally illustrating a development system for implementing one embodiment of the present invention. The system includes a markup compiler 202 and a parser 204. The markup compiler 202 and parser 204 are software modules (i.e., program modules 106 shown in FIG. 1) that may reside on a computing device, such as computing device 100 shown in FIG. 1. The markup compiler 202 inputs a markup document 206. In one embodiment, the markup document 206 is an extensible markup language (XML)-based document. Briefly, the markup document 206, illustrated in FIG. 4 and described in detail below, includes tags (not shown) that indicate parts of markup page that will be compiled as a subclass definition with the root tag on the page being the base class. As will be described in detail later, the tags indicate the presence of a subclass and associated elements. Upon encountering these tags, the markup compiler 202 begins communicating with parser 204 in order to build the subclass for the page.

In one embodiment, the functionality provided by parser 204 may be provided within markup compiler 202. In another embodiment, the functionality provided by parser 204 may be provided by deriving a parsing class from an existing parser class within the markup compiler 202. The derived parsing class may include function overrides for each of the subclass tokens (i.e., tags) defined in accordance with the present invention. Briefly, the function overrides may be part of a series of callback functions that signal a beginning and an ending for the definitions of the elements associated with the subclass.

Parser 204 is configured to parse subclass definitions within markup document 206. Briefly, the markup compiler 202 compiles content within the markup document 206. In one embodiment, the markup compiler 202 converts the content into a tokenized binary stream that is saved in a tokenized binary file 208. The tokenized binary file 208 may be one of several forms known to those skilled in the art. The tokenized binary file 208 represents a tree of components specified in the markup document 206. However, the markup compiler 202 may be unable to convert some of the content directly, this content may be sent to parser 204. The event attributes and element tags defined within the markup document 206 in accordance with the present invention is an example of such content. In overview, when the parser 204 sees the root tag in the markup stream, the parser 204 informs the markup compiler 202 to create a "page" subclass definition that derives from the class for the root tag in the markup document 206. Parser 204 then identifies properties, events, and the like within the subclass and relays pertinent information about these items to the markup compiler 202.

Upon receiving the pertinent information, markup compiler 202 adds tokens to the markup document 206 that are associated with the subclass The markup compiler 202 may also generate representative source code 212 from which intermediate language (IL) assemblies (hereinafter, referred to as assemblies 210) are created. Assemblies 210 include computer instructions for subclasses (e.g., pages) defined within markup document 206. In the past, these assemblies were generated using a software development tool that compiled and linked source code written using a programmatic language. One skilled in the art will also appreciate that, in another embodiment, the markup compiler 202 may generate the assemblies 210 without generating the tokenized binary file 208 without departing from the scope of the present invention.

Figure 3:
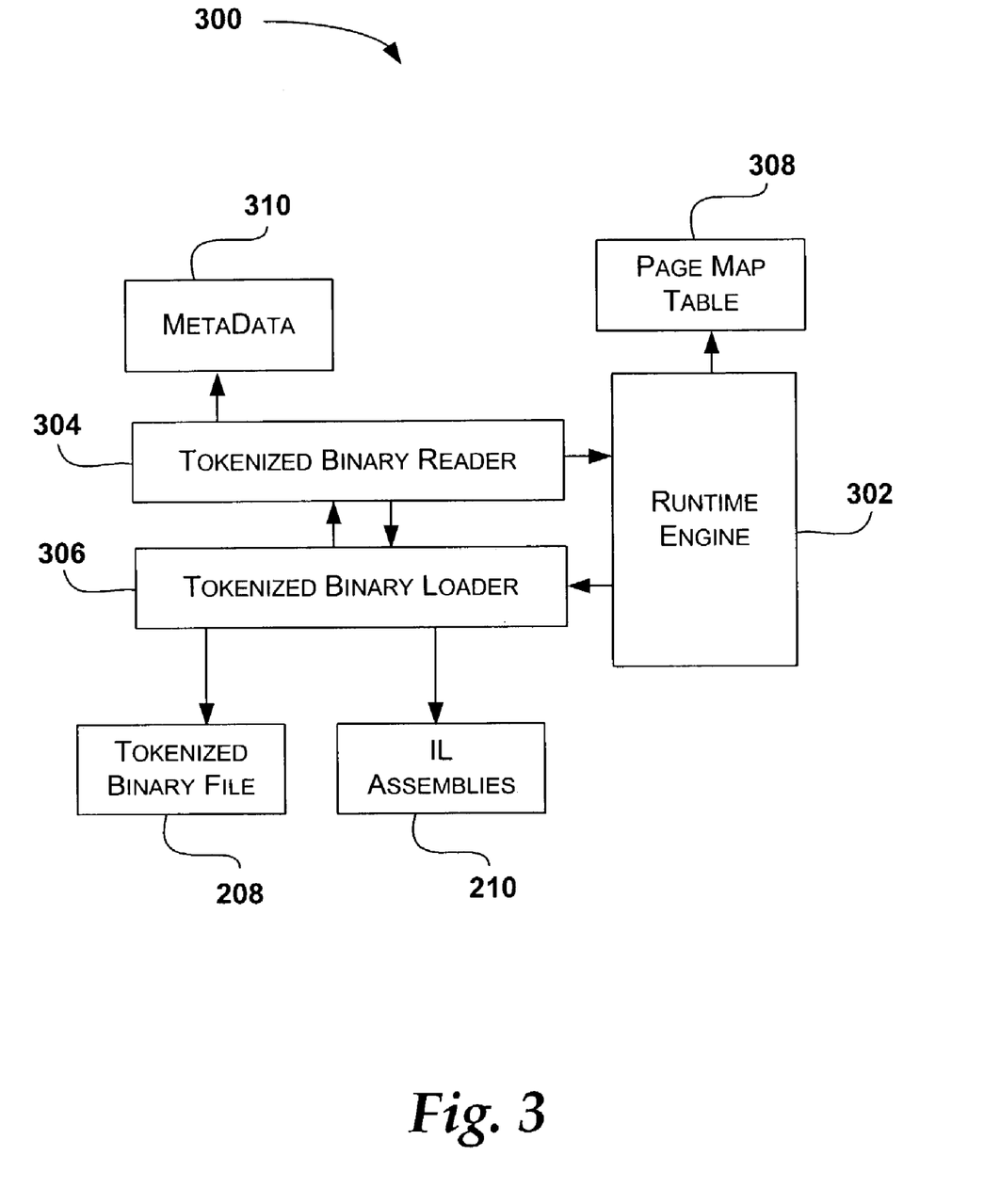
FIG. 3 is a functional block diagram generally illustrating a runtime environment for implementing one embodiment of the present invention.

FIG. 3 is a functional block diagram generally illustrating a runtime environment for implementing one embodiment of the present invention. The runtime environment includes a runtime engine 302, a tokenized binary reader 304, and a tokenized binary loader 306. When the runtime engine 302 receives a request for loading a particular resource (e.g., markup document 206 shown in FIG. 2), the runtime engine 302 accesses a page map table 308. The page map table 308 identifies whether or not the markup document 206 has a compiled version (e.g., tokenized binary file 208). If a compiled version exists, the runtime engine 302 communicates with the tokenized binary loader 306 to load the tokenized binary file 208. In one embodiment, the tokenized binary file 208 identifies any assemblies (e.g., assembly 210) associated with the tokenized binary file 208. The tokenized binary loader 306 then loads any of the identified assemblies 210. Once a portion or the entire tokenized binary file 208 and the associated assemblies 210 have been loaded, the tokenized binary reader 304 begins reading the tokenized binary file 208 to generate native instructions that are executed on a processor (e.g., processing unit 102 shown in FIG. 1). The tokenized binary reader 304 may access metadata 310 to determine information, such as types, methods, and events. In general, metadata 310 includes information about methods, fields, properties, and events. Each of these items may have its own metadata that can be read for additional details. Thus, using metadata 310, the tokenized binary reader 304 uses reflection during runtime to programmatically determine information about the elements within the tokenized binary file 208. In accordance with the present invention, described in conjunction with FIGS. 6 and 7, the tokenized binary reader 304 directly accesses a runtime connection (e.g., a method) that "hooks-up" events, resources, and the like. The subclasses that are originally defined in the markup document 206 may be directly executed using the assemblies 210 created in accordance with the present invention.

Runtime Connection Mechanism of Present Invention

Figure 4:
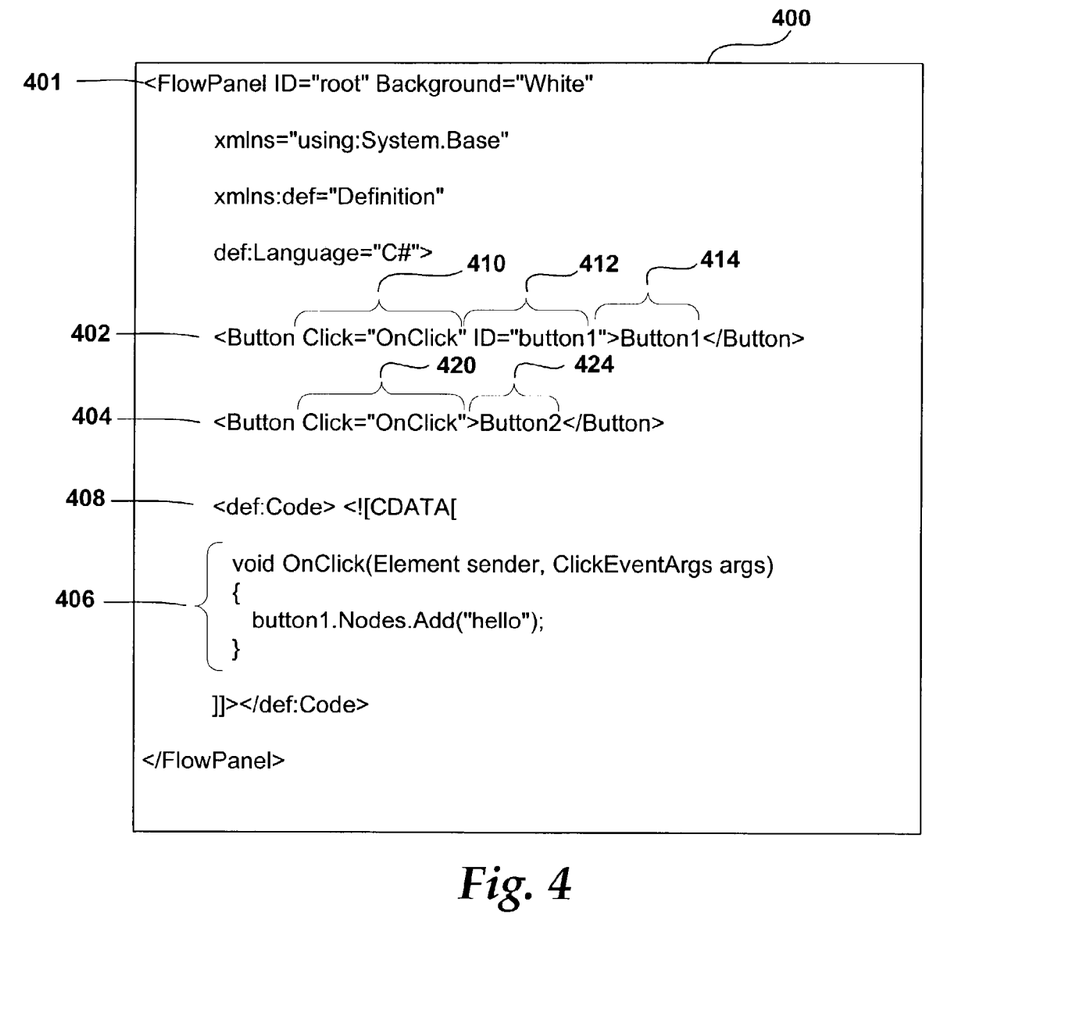
FIG. 4 illustrates salient portions of a markup document that illustrate an exemplary syntax for declaratively defining events for a subclass, which are compiled in a manner to create a runtime connection interface in accordance with one embodiment of the present invention.

FIG. 4 illustrates salient portions of a markup document that illustrates an exemplary syntax for declaratively defining events in a subclass. Markup 400 includes two element tags 402 and 404. These element tags 402 and 404 are child elements of the root element 401. Markup 400 illustrates root element 401 being subclassed for a page. However, in another embodiment, the root element 401 could be subclassed for a component by specifying a tag within markup 400 which is parsed into a subclass. The following discussion uses the term page subclass in describing the invention.

Element tag 402 includes an event attribute 410, an ID attribute 412, and text 414. The event attribute 410 specifies an event trigger (e.g., "Click") and an event value (e.g., "OnClick"). The event trigger specifies the event that is monitored and the event value specifies the method that is executed when the event trigger occurs. As shown, the event value is associated with a OnClick method 406 that is defined as a code snippet within a code hint 708. The code hint 708 allows developers to add code snippets to the body of the page class definition. The code snippets are written into the representative code. For example, the OnClick method 406 appears on lines 7-8 in FIG. 7.

Element tag 404 includes an event attribute 420 and text 424. Again, event attribute 420 specifies an event trigger (e.g., "Click") and an event value (e.g., "OnClick") as described above. One will note that the developer did not specify an ID attribute for element tag 404 within markup 400. The process for compiling markup 400 to create a runtime connection interface for an event handler is described below in conjunction with FIG. 5.

Figure 5:
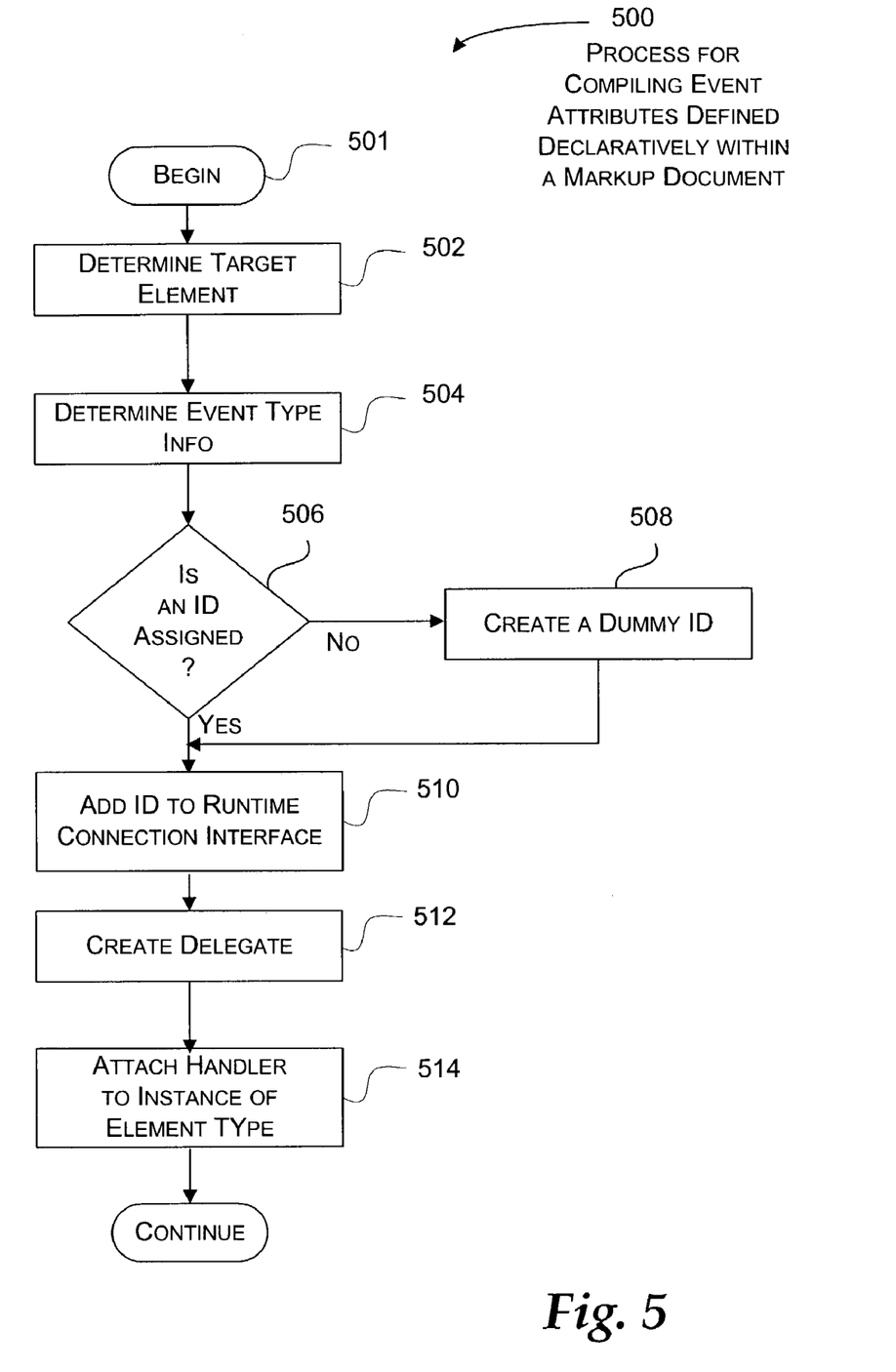
FIG. 5 is a logical flow diagram illustrating a process for compiling event attributes that are defined within a subclass page in a markup document in accordance with the present invention.
Figure 7:
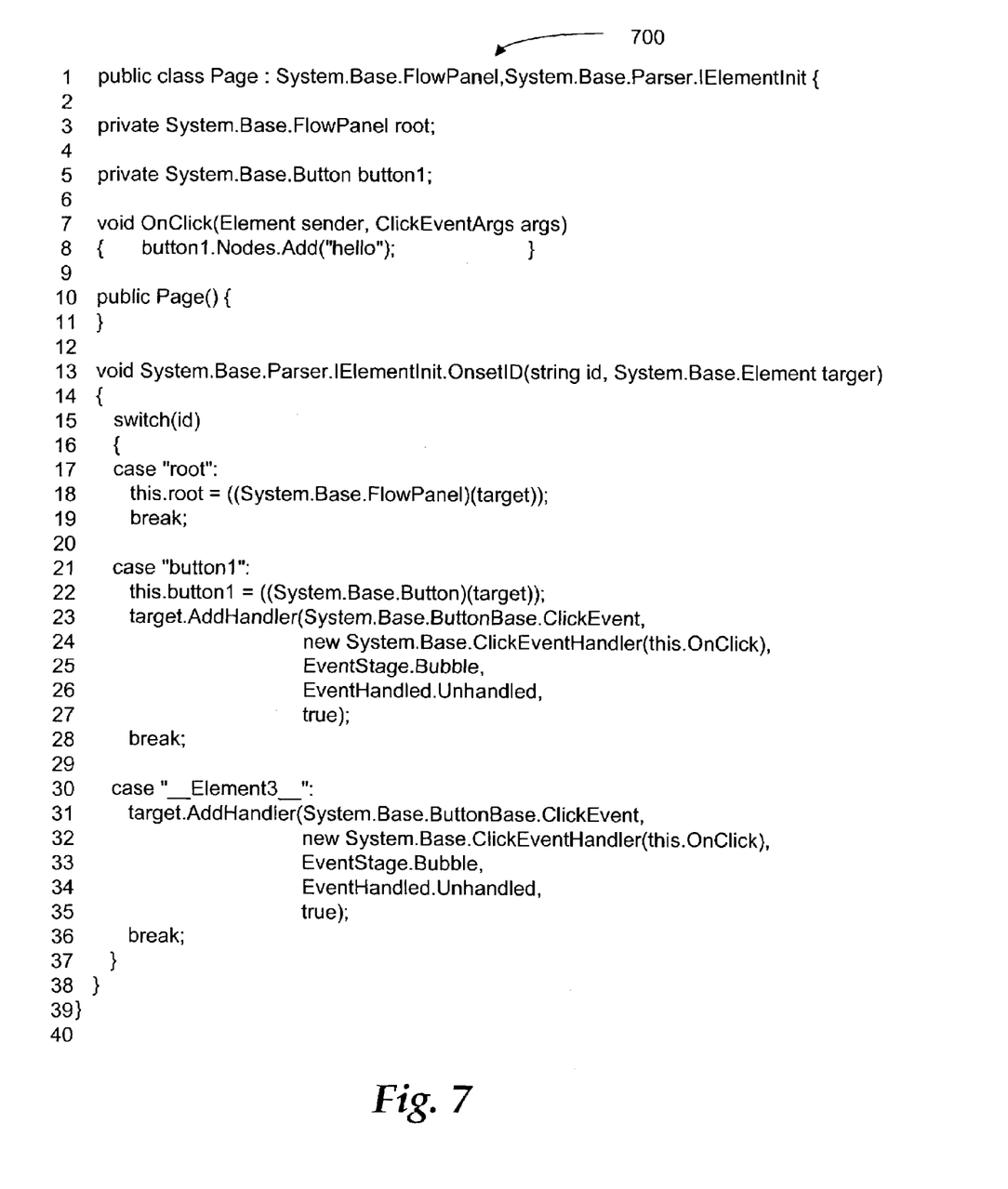
FIG. 7 is an exemplary source code listing of representative source code generated for the markup shown in FIG. 4 in accordance with FIG. 5 by the markup compiler shown in FIG. 2.

FIG. 5 is a logical flow diagram illustrating a process 500 for compiling event attributes defined within a markup page document. The exemplary markup shown in FIG. 4, along with the representative source code in FIG. 7, is used in conjunction with FIG. 5 to describe process 500. Thus, process 500 creates a runtime connection that does not require reflection to be used during runtime in order for events, resources, and the like to be properly hooked-up. As one will note, the representative code in FIG. 7 is C# source code. However, the markup compiler, in accordance with the present invention, may generate representative code using the syntax of any programming language that currently exists and those that may be developed in the future.

The process 500 begins at block 501, where an attribute on a tag has been identified as an event attribute. A page subclass is already being processed. The page subclass uses the root tag on the page as the base class. For example, referring to FIGS. 4 and 7, the root tag 401 (i.e., "FlowPanel") is the base class defined on line 1 of FIG. 7. In addition, the base class inherits functionality from the IElementInit class. IElementInit, as will be described below, provides the runtime connection interface (i.e., "OnsetID"). Processing continues at block 502.

At block 502, based on the event attribute, a target element is determined. In one embodiment, this determination performs reflection when determining the target element. For example, assuming the event attribute 410 shown in FIG. 4 is being compiled, the parser is aware that the button class is defined within the "System.Base" namespace. Therefore, the parser performs reflection within the System.Base namespace to identify a target element associated with "Button". Once the target element is determined, processing continues at block 504.

At block 504, an event type is determined for the above target element. For example, a class may have several different events defined for objects that become instantiated from the class. Referring to FIG. 4 and event attribute 410, block 504 determines the event type associated with "Click" using reflection. Once the dynamic event type is determined, processing continues at decision block 506.

At decision block 506, a determination is made whether an ID has been assigned to the target element (e.g., button in FIG. 4). Attributes on a tag in markup may be specified in any order. Therefore, unlike the definition of the element 402 shown in FIG. 4, the id attribute 412 may occur before the event attribute 410. If this occurs, the process is already aware of the ID and processing would continue at block 510. However, in situations, such as the one shown, the parser may not yet be aware of the ID or know whether an event attribute exists for the element. Therefore, in one embodiment, processing of the event attribute may not occur until other types of attributes have been processed, such as ID attribute 412 shown in FIG. 4. If the process determines that the target element does not have an ID attribute associated with the target element, processing continues at block 508.

At block 508, a dummy ID is generated for the target element. For example, in FIG. 4, element tag 404 does not have an associated id attribute. Therefore, a dummy id (e.g., "_Element3_") is generated (see line 30 in FIG. 7). The dummy id may be generated using any convention as long as each dummy id uniquely identifies the target element. This dummy ID is then saved as a token within the tokenized binary file. Processing continues at block 510, the same as if the determination at decision block 506 had identified an ID for the target element.

At block 510, the ID is added to the runtime connection interface. In one embodiment, shown in FIG. 7, the runtime connection interface provides an "OnSetID" method within the IElementInit interface. The OnSetID method includes a switch statement that includes the IDs of the target elements as a conditional for the switch statement. Thus, as shown on line 21 of FIG. 7, the element tag 402 with an ID="button1", lists "button1" for one of the case statements in the switch. Likewise, as shown on line 30 of FIG. 7, the element tag 402 that did not have an ID attribute, lists a dummy id (e.g., "_Element3_") for one of the case statements of the switch. One skilled in the art will recognize that each target element is not necessarily required to have its associated ID listed for one of the case statements of the switch. However, if the target element does not have its associated ID listed for one of the case statements of the switch, the runtime connection mechanism of the present invention will not be available for the target element. Processing continues at block 512.

At block 512, a delegate for the event is created. The delegate is created on the method specified as the event attribute value. For example, referring to FIGS. 7 and 13, the event attribute value (e.g., "OnClick") associated with element tag 402 is assigned as the event handler (see line 24 in FIG. 7). Processing continues at block 514.

At block 514, the event handler is attached to an instance of the element type. Again, referring to FIG. 7, the event handler ("OnClick") is attached to the instance (e.g., "target") of the element type. In one embodiment, the method for attaching the event handler executes an "AddHandler" method. Processing then continues for further processing of attributes and element tags in the page subclass.

Figure 6:
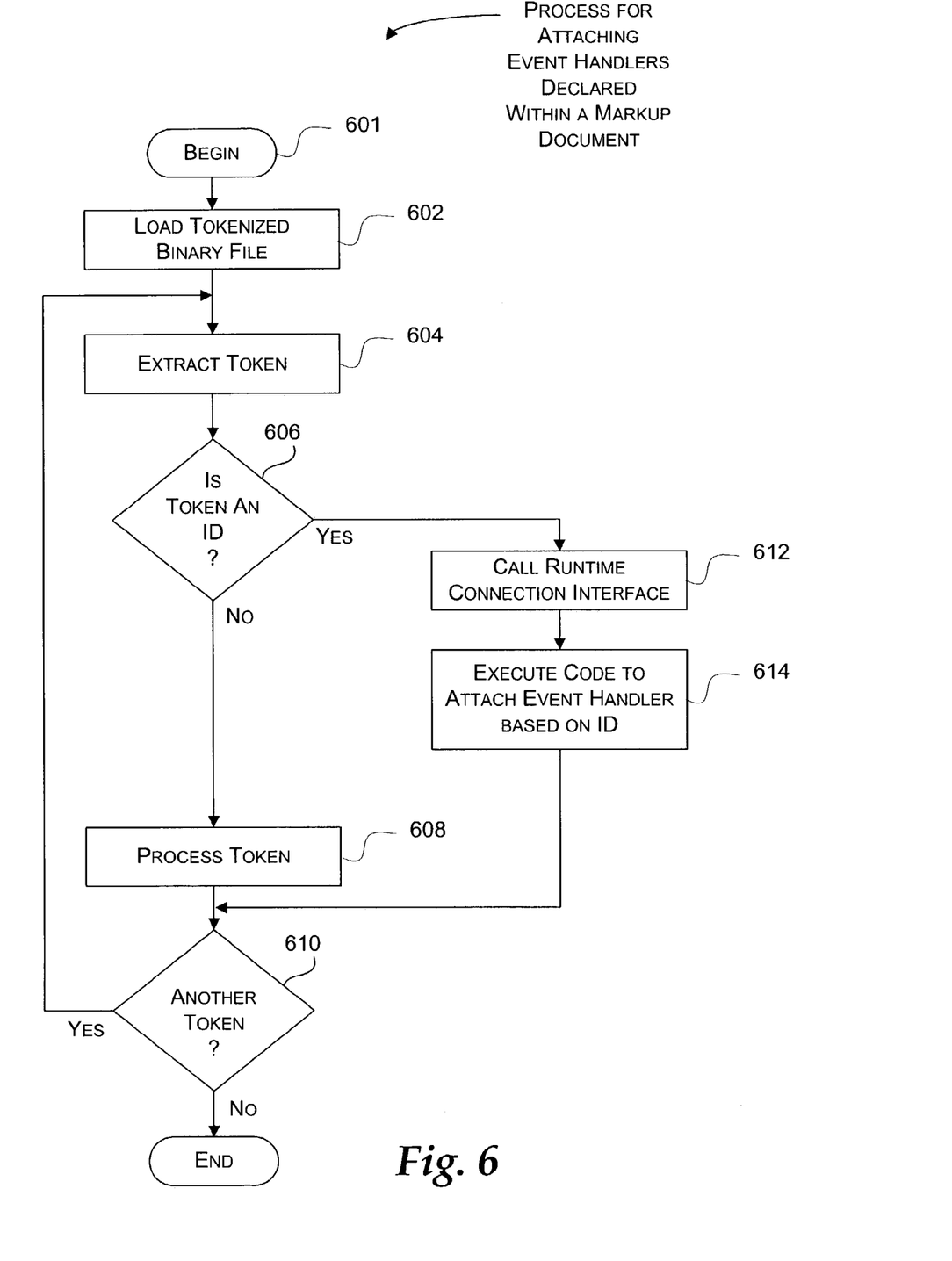
FIG. 6 is a logical flow diagram generally illustrating a runtime process for using subclasses declared from within a markup document in accordance with one embodiment of the present invention.

FIG. 6 is a logical flow diagram generally illustrating a runtime process 600 for hooking up an event to an instance of a subclass in accordance with one embodiment of the present invention. The exemplary markup shown in FIG. 4 is used in conjunction with FIG. 6 to describe the process 600.

The process 600 begins at block 601, where a runtime engine receives a request for loading a particular resource (e.g., markup document) and determines that a compiled version exists for the particular resource. The associated tokenized binary file that includes the tokenized attributes for markup 400 will then be processed using process 600 in accordance with the present invention. Processing continues at block 602.

At block 602, the tokenized binary file is loaded. The tokenized binary file may be loaded incrementally or in its entirety. The tokenized binary file may identify assemblies associated with the tokenized binary file that need to be loaded. With reference to FIG. 4, for example, the assemblies associated with the Button class are loaded, in particular the assembly generated from representative source code shown in FIG. 7 is loaded for the page subclass. Processing continues at block 604.

At block 604, a token is retrieved from the tokenized binary file. As mentioned above, in the new runtime environment, the tokenized binary file that is generated is independent from the programming language that was used to generate the tokenized binary file. Thus, the runtime engine may process the tokenized binary file without regard to the programming language that was originally used to create the tokenized binary file. Processing continues at decision block 606.

At decision block 606, a determination is made whether the token that was retrieved is an ID. If the token is not an ID, processing continues at block 608.

At block 608, the token is processed. As mentioned above, the processing of the token does not depend on the manner in which the tokenized binary file is generated. In other words, processing a token in a tokenized binary file that was created declaratively from within a markup document or using a programming language will proceed in the same manner. Therefore, because the processing of tokens within a tokenized binary file is known to those skilled in the art, the processing of the token need not be discussed at length here. Processing continues at decision block 610.

At decision block 610, a determination is made whether there are any more tokens in the tokenized binary file. If there are more tokens, processing loops back to block 604 and proceeds as described above. On the other hand, if there are no more tokens, processing is complete and continues to the end block.

Returning to decision block 606, if the token is an ID, processing continues at block 612. At block 612, upon encountering an element, the parser knows that a runtime connection interface is available for the element as described above. Thus, assuming that the token corresponds to the element tag 402 defined in markup 400, the token will identify the id (i.e., "button1") and hence implicitly the click event 410. Thus, the runtime connection interface (e.g., "OnSetID") may be called by passing the id and the element instance of the element tag 402 type that the parser has already created (as the target). Processing continues at block 614.

At block 614, the runtime connection interface will execute the switch statement (shown in FIG. 7). The instructions associated with the "button1" case statement will execute. Thus, lines 22-29 in FIG. 7 will execute, thereby attaching the event handler to the instance of the target type based on the id that was passed. Once the event handler is attached in accordance with the present invention, the operation of the event handler occurs as is known within the art. Processing then continues to decision block 610 as proceeds as described above.

One will note that in accordance with the present invention, reflection is not necessary to hookup the event handler during runtime. In addition, one will note that any dummy id that is generated for an attribute is saved in the tokenized binary file along with the tokenized attribute. This allows elements that have not been assigned an ID the ability to use the runtime connection interface of the present invention.

Thus, as described, the present invention provides a mechanism for hooking up events, resources, and the like directly at runtime without using reflection. By so doing, the present invention achieves a substantial increase in performance during runtime.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer storage medium having instructions that when executed by a processor perform a method comprising:
identifying a subclass attribute that is associated with an event and that is defined within an element tag of a markup document that defines a subclass,
determining a target element based on an event attribute; wherein the event attribute specifies an event trigger and an event value; wherein the event value is associated with a method that is executed when the event trigger occurs and wherein the target element includes a dynamic event type;

determining an identifier for the target element;

receiving the markup document as input at a markup compiler;

sending content included within the markup document to a parser to be parsed when the content cannot be compiled directly;

receiving information about the content that cannot be compiled directly from the parser; and generating source code at the markup complier in response to the markup document and the information about the content that cannot be compiled directly; wherein the source code is configured such that when it is executed it provides a direct runtime connection mechanism for subclass attributes and elements that are defined within the markup document; wherein the runtime connection mechanism is used for attaching an item associated with the subclass attribute to an instance of the target element during runtime, the runtime connection mechanism attaching the item to the instance based on the identifier.

2. The computer storage medium of claim 1, wherein the subclass attribute defines an event and an event handler and the item is the event handler.

3. The computer storage medium of claim 1, further comprising determining an element tag that is defined within the subclass in the markup document that defines a resource.

4. The computer storage medium of claim 1, wherein determining the identifier includes locating an identifier attribute associated with the target element, the identifier attribute defining the identifier.

5. The computer storage medium of claim 1, wherein determining the identifier includes generating a dummy identifier for the target element, the dummy identifier uniquely identifying the target element.

6. The computer storage medium of claim 1, wherein the runtime connection mechanism includes an element init interface having a first method that attaches the item to the instance.

7. The computer storage medium of claim 6, wherein the first method includes a switch statement and one of the case statements for the switch statement is associated with the identifier.

8. The computer storage medium of claim 7, wherein a condition for the case statement is the identifier.

9. The computer storage medium of claim 6, wherein in the one case statement associated with the identifier invokes an addhandler method.

10. A computer storage medium having instructions that when executed by a processor perform a method comprising:

identifying an attribute defined within a markup document, the attribute being associated with a target element; wherein the target element includes a dynamic event type and is determined based on an event attribute that specifies an event trigger and an event value;

retrieving an identifier associated with the target element;

calling an interface within an executable assembly;

passing the target element and the identifier to the interface, the interface performing instructions to directly attach an item associated with the attribute to an instance of the target element;

receiving the markup document as input at a markup compiler;

sending content included within the markup document to a parser to be parsed when the content cannot be compiled directly;

receiving information about the content that cannot be compiled directly from the parser; and generating source code at the markup complier in response to the markup document and the information about the content that cannot be compiled directly; wherein the source code is configured such that when it is executed it provides a direct runtime connection mechanism for subclass attributes and elements that are defined within the markup document; wherein the runtime connection mechanism is used for attaching an item associated with the subclass attribute to an instance of the target element during runtime, the runtime connection mechanism attaching the item to the instance based on the identifier.

11. The computer storage medium of claim 10, wherein the attribute defines an event and an event handler and the item is the event handler.

12. The computer storage medium of claim 10, wherein the attribute defines a resource.

13. The computer storage medium of claim 10, wherein the interface locates the instructions to attach an item based on the identifier.

14. The computer storage medium of claim 13, wherein the interface includes a switch statement and one of the case statements for the switch statement is associated with the identifier.

15. The computer storage medium of claim 14, wherein the condition for the one case statement is the identifier.

16. A computer system for processing a markup document, the computer system comprising:

a processor; and a memory, the memory being allocated for a plurality of computer-executable instructions which are loaded into the memory for execution by the processor, the computer-executable instructions performing a method comprising:

identifying a subclass attribute defined within a file that defines a subclass, the subclass attribute being associated with a target element; wherein the target element includes a dynamic event type and is determined based on an event attribute that specifies an event trigger and an event value;

retrieving an identifier associated with the target element from within the file;

calling an interface within an executable assembly;

passing the target element and the identifier to the interface, the interface performing instructions to attach an item associated with the subclass attribute to an instance of the target element;

receiving the markup document as input at a markup compiler;

sending content included within the markup document to a parser to be parsed when the content cannot be compiled directly;

receiving information about the content that cannot be compiled directly from the parser; and generating source code at the markup complier in response to the markup document and the information about the content that cannot be compiled directly; wherein the source code is configured such that when it is executed it provides a direct runtime connection mechanism for subclass attributes and elements that are defined within the markup document; wherein the runtime connection mechanism is used for attaching an item associated with the subclass attribute to an instance of the target element during runtime, the runtime connection mechanism attaching the item to the instance based on the identifier.

17. The computer system of claim 16, wherein the attribute defines an event and an event handler and the item is the event handler.

18. The computer system of claim 16, wherein the attribute defines a resource.

19. The computer system of claim 16, wherein the interface locates the instructions to attach an item based on the identifier.

20. The computer system of claim 19, wherein the interface includes a switch statement and one of the case statements for the switch statement is associated with the identifier.

21. The computer system of claim 16, wherein the file includes a markup document.

22. The computer system of claim 16, wherein the file includes a tokenized binary file generated by compiling a markup document.

23. A computer system for generating an assembly from a subclass definition with a markup document, the computer system comprising:
   a processor; and
   a memory, the memory being allocated for a plurality of computer-executable instructions which are loaded into the memory for execution by the processor, the computer-executable instructions performing a method comprising:
   identifying a subclass attribute that is defined within an element tag of a markup document that defines a subclass,
   determining a target element based on the subclass attribute; wherein the target element includes a dynamic event type and is determined based on an event attribute that specifies an event trigger and an event value;
   determining an identifier for the target element; and
   receiving the markup document as input at a markup compiler;
   determining when content cannot be compiled directly;
   sending content included within the markup document to a parser to be parsed when the content cannot be compiled directly;
   receiving information about the content that cannot be compiled directly from the parser;
   generating source code at the markup complier in response to the markup document and the information about the content that cannot be compiled directly; wherein the source code is configured such that when it is executed it provides a direct runtime connection mechanism for subclass attributes and elements that are defined within the markup document; wherein the runtime connection mechanism is used for attaching an item associated with the subclass attribute to an instance of the target element during runtime, the runtime connection mechanism attaching the item to the instance based on the identifier.

24. The computer system of claim 23, wherein the subclass attribute defines an event and an event handler and the item is the event handler.

25. The computer system of claim 23, further comprising determining an element tag that is defined within the subclass in the markup document that defines a resource.

26. The computer system of claim 23, wherein determining the identifier includes locating an identifier attribute associated with the target element, the identifier attribute defining the identifier.

27. The computer system of claim 23, wherein determining the identifier includes generating a dummy identifier for the target element, the dummy identifier uniquely identifying the target element.

28. The computer system of claim 23, wherein the runtime connection mechanism includes an element init interface having a first method that attaches the item to the instance.

29. The computer system of claim 23, wherein the first method includes a switch statement and one of the case statements for the switch statement is associated with the identifier.

30. A computer-implemented method comprising:
   identifying subclass attributes for a subclass that is defined within a markup document, the subclass attributes being associated with target elements being declaratively defined within the markup document; wherein each of the target elements include a dynamic event type and wherein each of the target elements is determined based on an event attribute that specifies an event trigger and an event value;
   determining identifiers for the target elements;
   receiving the markup document as input at a compiler; and
   transmitting content included within the markup document to a parser when the content cannot be compiled directly; wherein parser transmits to the compiler information about the content that cannot be compiled directly from the parser; and wherein the compiler generates source code in response to the markup document and the information about the content that cannot be compiled directly; wherein the source code is configured such that when it is executed it provides a direct runtime connection for attaching items associated with the subclass attributes to an instance of at least one of the target elements during runtime, the runtime connection configured to attach the items to the instance based on the identifier.

31. The computer-implemented method of claim 30, wherein the runtime connection includes an element init interface having a first method, the first method configured to execute a first group of instructions associated with the identifier, the first group of instructions configured to attach the items to the instance.

32. The computer-implemented method of claim 31, wherein the subclass attributes define an event and an event handler.

33. A computer-implemented method comprising:
   identifying an attribute defined within a tokenized file that defines a subclass, the attribute being associated with a target element; wherein the target element includes a dynamic event type and is determined based on an event attribute that specifies an event trigger and an event value;
   retrieving an identifier associated with target element from within the tokenized file;
   calling an interface within an executable assembly;
   passing the target element and the identifier to the interface, the interface performing instructions to directly attach an item associated with the attribute to an instance of the target element;
   receiving the markup document as input at a compiler; and
   transmitting content included within the markup document to a parser when the content cannot be compiled directly; wherein the parser transmits to the compiler information about the content that cannot be compiled directly from the parser; and wherein the compiler generates source code in response to the markup document and the information about the content that cannot be compiled directly; wherein the source code is configured such that when it is executed it provides a direct runtime connection mechanism for subclass attributes and elements that are defined within the markup document;

wherein the runtime connection mechanism is used for attaching an item associated with the subclass attribute to an instance of the target element during runtime, the runtime connection mechanism attaching the item to the instance based on the identifier.

34. The computer-implemented method of claim 33, wherein the attribute defines an event and an event handler and the item is the event handler.

35. The computer-implemented method of claim 33, wherein the file includes a markup document.

36. The computer-implemented method of claim 33, wherein the file includes a tokenized binary file generated by compiling a markup document.

* * * * *